United States Patent
Kunishi et al.

(12) 
(10) Patent No.: US 6,501,492 B1
(45) Date of Patent: *Dec. 31, 2002

(54) IMAGE FORMING APPARATUS FOR OUTPUTTING IMAGE IN RESPONSE TO DIGITAL IMAGE SIGNAL

(75) Inventors: Tsuyoshi Kunishi, Yokohama (JP); Kazushige Nishiyama, Shiki (JP); Yuichiro Toyohara, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,058

(22) Filed: Mar. 10, 1997

Related U.S. Application Data (63) Continuation of application No. 08/151,898, filed on Nov. 15, 1993, now abandoned.

(30) Foreign Application Priority Data

Nov. 13, 1992 (JP) .............................................. 4-327522
Dec. 24, 1992 (JP) .............................................. 4-344561

(51) Int. Cl.[7] .............................................. B41J 2/385
(52) U.S. Cl. ......................... 347/111; 347/131; 358/2.1
(58) Field of Search ................................... 347/140, 131, 347/111, 132, 155, 156; 358/1.9, 462, 2.1

(56) References Cited

U.S. PATENT DOCUMENTS

| | | | | |
|---|---|---|---|---|
| 4,679,057 A | * | 7/1987 | Hamada | 347/252 |
| 4,680,646 A | * | 7/1987 | Ikeda et al. | 347/131 X |
| 4,897,734 A | * | 1/1990 | Sato et al. | 358/448 |
| 4,914,455 A | * | 4/1990 | Hayes | 347/131 |
| 4,926,268 A | * | 5/1990 | Kawamura et al. | 358/3.1 |
| 5,119,129 A | * | 6/1992 | Setani | 347/131 X |
| 5,250,959 A | * | 10/1993 | Yamada et al. | 347/132 |
| 5,270,736 A | * | 12/1993 | Inoue et al. | 347/246 |

* cited by examiner

*Primary Examiner*—David F. Yockey
(74) *Attorney, Agent, or Firm*—Fitzpatrick, Cella, Harper & Scinto (57) ABSTRACT

An image forming apparatus for outputting an image through an electrophotographic process in accordance with a digital image signal includes an electrophotographic photosensitive member; an optical system for applying light information to the photosensitive member; a developing device for forming a toner image on the photosensitive member; an input path for a plurality of digital image signals containing a bi-level digital image signal and a multi-level digital image signal; a controller for changing developing condition of the developing device when the image is outputted in accordance with the bi-level digital image signal, and changing an image forming condition which is different from the developing condition when an image is outputted in accordance with a multi-level digital image signal.

14 Claims, 7 Drawing Sheets

IMAGE FORMING APPARATUS FOR OUTPUTTING IMAGE IN RESPONSE TO DIGITAL IMAGE SIGNAL

This application is a continuation of application Ser. No. 08/151,898 filed Nov. 15, 1993, now abandoned.

FIELD OF THE INVENTION AND RELATED ART

The present invention relates to an image forming apparatus for outputting images in accordance with digital image signals through an electrophotographic process. Examples of such an apparatus include a digital printer and a digital copying machine or the like.

There are conventional image forming apparatuses for forming visualized images corresponding to digital image signals bearing density information for pixels.

A laser beam printer or the like is widely used, in which a laser beam emitted in accordance with the image signal scans a surface of an image bearing member such an an electrophotographic photosensitive member or the like having been uniformly charged by charging means so that an electrostatic latent image is formed on the surface of the image bearing member, and the electrostatic latent image is developed into a toner image, which in turn is transferred onto a transfer material by transfer means and then is fixed on a transfer material by fixing means. As a developing means for this use, there is a developing device in which a developer carrying member supplied with a bias voltage having at least a DC voltage component, is faced to the image bearing member, by which the electrostatic latent image is developed into a toner image on the surface of the image bearing member.

In an image forming apparatus for visualizing a digital image signal, it would be considered that there are provided a plurality of input paths, and one path is selected therefrom, and the image forming operation is carried out in accordance with the image signal supplied through the selected input path. The digital image signals are classified into the following two groups. The first is bi-level digital image signals for reproducing dots, lines and two dimensional solid images, such as image signals for documents or the like generated by image signal generating means such as a computer. The second is a multi-level digital image signal which alqo bears tone level (density level) in addition to the shape of the image, such as an image signal read from an original or the like by image reading means using CCD or the like.

Figure 4:
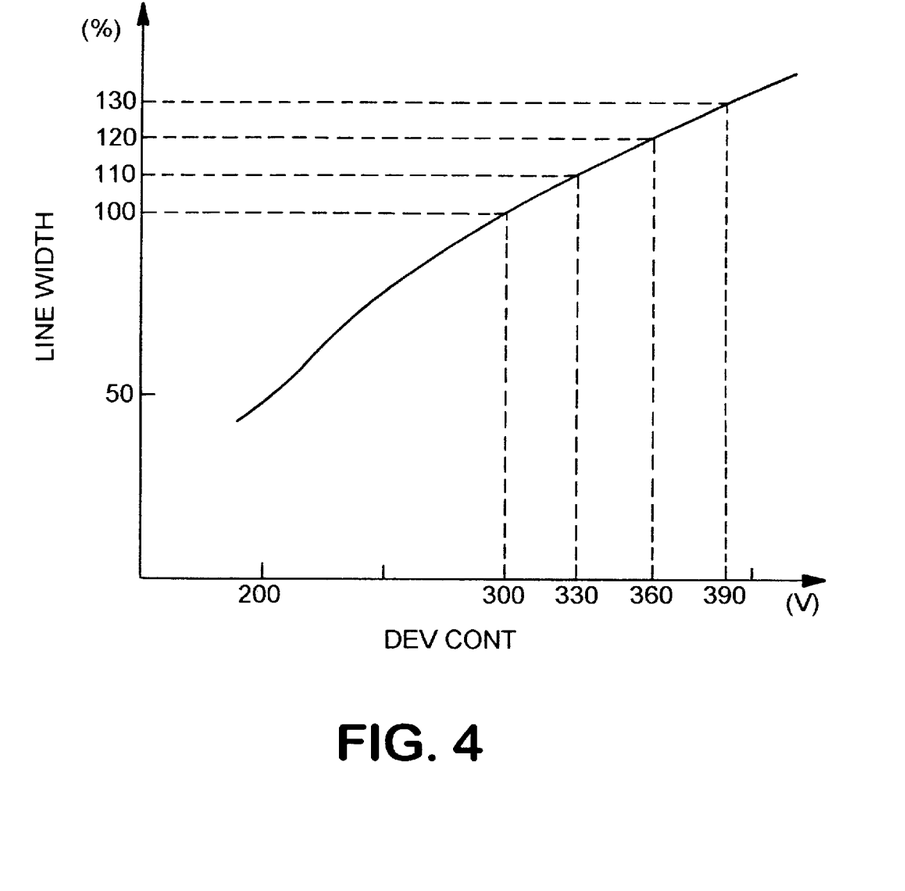
FIG. 4 shows a relation between a development contrast and a line width of one pixel reproduced by the development contrast.

In the case of the above-described first type signal, the laser beam printer or the like simply turns on and off the laser beam, since what is required is only to reproduce the shape of the image. In this case, that is, the bi-level image signal, it is desirable that the output is such that the size of one pixel is larger than the theoretical size of one pixel by 10–30% approximately, since then the dot and the line corresponding to one or two pixels approximately, are easily recognized by human eyes. Heretofore, it has been proposed that the size of the one pixel is reproduced to be larger by increasing the developing contrast of the developing means. FIG. 4 shows an example of a relationship between the development contrast and the width of a line of one dot width. A printer which visualizes the bi-level image signal requires means for changing the output property so as to change the thickening of the line width. For this purpose the developing bias voltage is adjusted so as to provide a thin line (larger than the theoretical value by 10%), normal line (20%), or thick line (30%).

Figure 6:
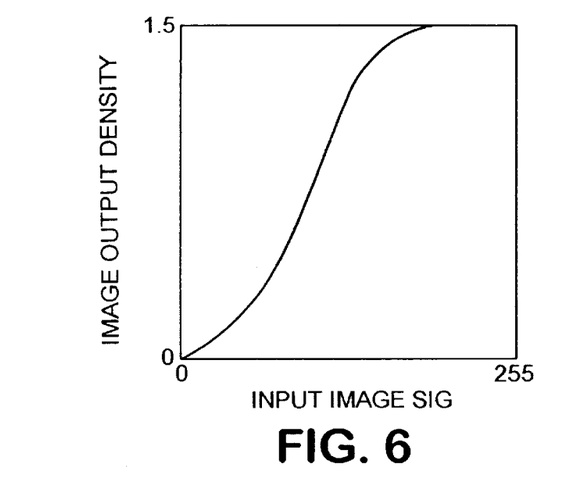
FIG. 6 shows a property of a printer without γ conversion.

In the case of the second type signal for visualizing multi-level image signals, a copying machine type laser beam printer is required to reproduce the tone levels in addition to the shape of the image. To accomplish this, as indicated by a line 2 in FIG. 7, it produces an output bearing information indicative of the density of the image which is linear with respect to the signal level supplied for respective pixel. The relationship between the input signal and the output signal when the laser beam emits the quantities of light proportional to the multi-levels for each pixel (without γ conversion), is determined by the developing property of the developing means and the photosensitive property of the image bearing member. The relation without the γ conversion is not rectilinear in the case of the image bearing members and developing means having been used. FIG. 6 shows an example of the relation without the γ conversion. In the prior art, in order to convert this relation to a rectilinear output-density property, the multi-level image signal supplied to the printer is subjected to a γ conversion process so that the laser is actuated such that the quantity of light for each pixel is proportional to the signal level of the multi-level signal after the γ conversion. This means is widely used.

In the printer or the like which visualizes the multi-level image signals, means for changing the output property in accordance with the state of the original, is required. More particularly, the γ conversion process is changed so that only the background fog is reduced when the original is of the nature tending to produce the background fog, and such that the density is increased when the image density of the original is generally low, in order to provide the output property indicated by lines 1 and 3 in FIG. 7.

Figure 7:
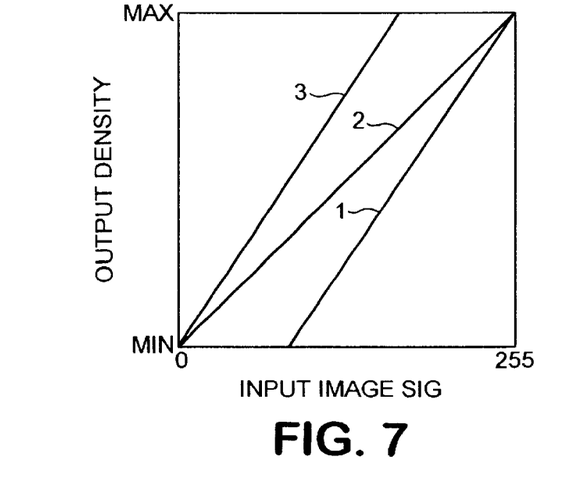
FIG. 7 shows an output property of a printer with a γ conversion.

The following defects are predicted when there are provided two digital image signal input paths (bi-level and multi-level), one path is automatically or manually selected from the paths, and the image is formed in response to the image signals supplied through the selected input path. When a means for changing the developing contrast is used as a means for changing the image output property, the property of the output image of the multi-level image signal does not change as shown in FIG. 7. In addition, in case of the image produced in response to the multi-level signal or the like, the size of one pixel changes with the result of reduction of the tone gradation in the case of halftone dot image. On the other hand, means for changing the γ conversion process is used to change the image output property, an area of a black portion can not be changed in an image formed by a combination of only white and black dots, line and solid images using bi-level image signals, because the γ conversion is for the multi-level signal. These problems are found when an attempt is made to adjust the image quality when an image is outputted after development of an electrostatic latent image formed in accordance with bi-level and multi-level digital image signals. It is considered that this results from a difference in the electrostatic latent images formed by the bi-level and multi-level signals.

SUMMARY OF THE INVENTION

Accordingly, it is a principal object of the present invention to provide a solution to the problem arising when one image forming apparatus processes bi-level and multi-level image signals.

It is another object of the present invention to provide an image forming apparatus and method in which sufficient image quality adjustment is enabled for the bi-level and multi-level image signals.

It is a further object of the present invention to provide an image forming apparatus and method in which the operativity is improved in the image quality adjustment at the time of the image formation by the bi-level and multi-level image signals.

According to an aspect of the present invention, there is provided an image forming apparatus for outputting an image through an electrophotographic process in accordance with a digital image signal, comprising: an electrophotographic photosensitive member; optical means for applying light information to the photosensitive member; developing means for forming a toner image on the photosensitive member; an input path for a plurality of digital image signals containing a bi-level digital image signal and a multi-level digital image signal; control means for changing developing condition of the developing means when the image is outputted in accordance with the bi-level digital image signal, and changing an image forming condition which is different from the developing condition when an image is outputted in accordance with a multi-level digital image signal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiment 1

Figure 2:
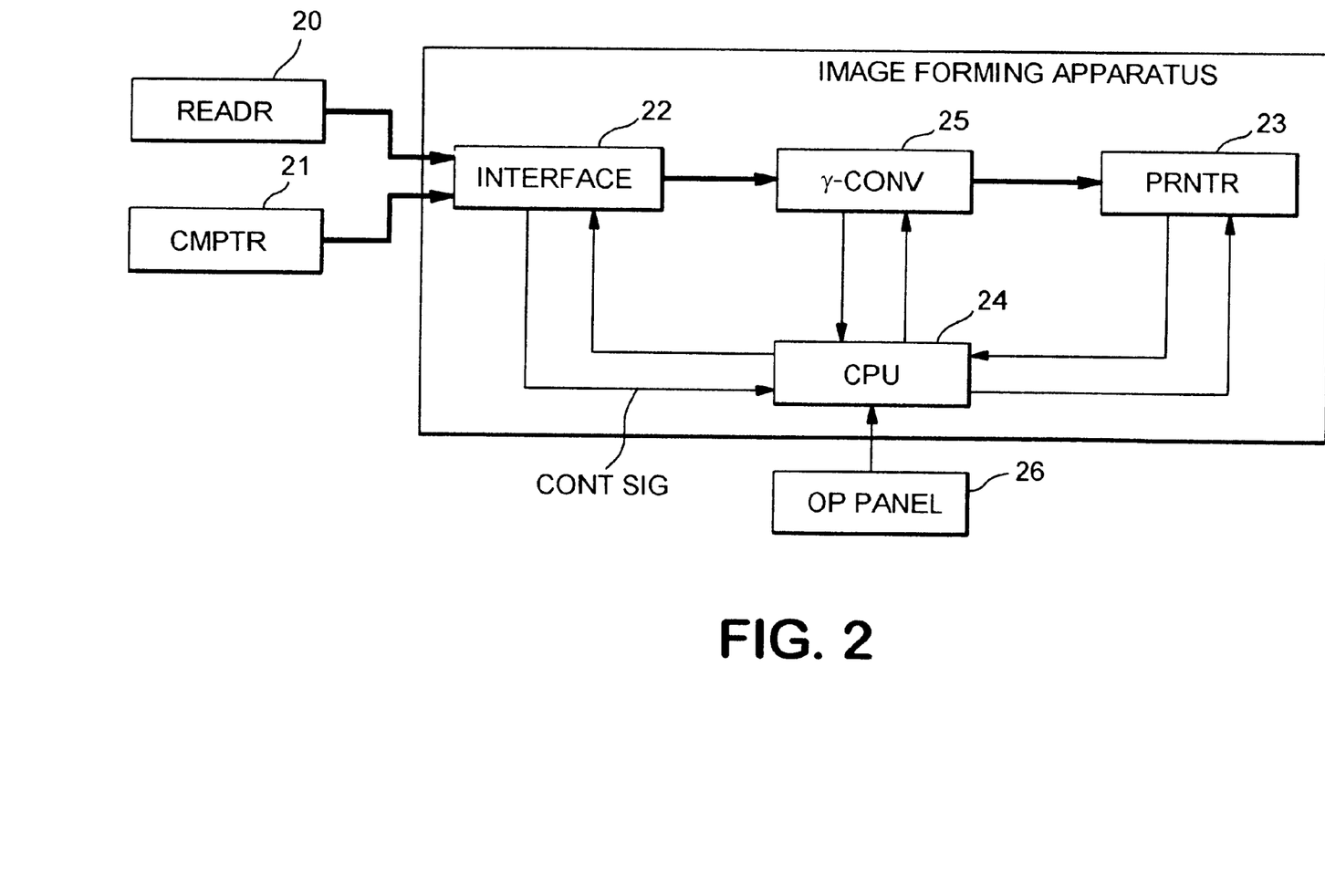
FIG. 2 is a block diagram illustrating flow of control signals and image signals in an image forming apparatus according to an embodiment of the present invention.

FIG. 2 is a block diagram showing flows of image signals and control signals in an image forming apparatus implementing the present invention.

The apparatus of this embodiment is provided with two Input paths including input terminals for receiving signals from a conventional reader 20 for converting image information from an original or the like to a multi-level digital image signal of 0–255 levels, and from a computer 21 capable of producing and editing bi-level digital image signals of 0 and 1, namely, from two image signal output devices. The structure of the reader 20 is not shown in the Figure for the purpose of simplicity, but it will be described briefly. An original or the like is illuminated with light from a halogen lamp, fluorescent light or the like, and the light reflected from the original is projected onto a photoelectric conversion means such as a CCD or the like through an optical system including a lens and mirror or the like. The analog electric signal produced thereby is converted to multi-level digital image signal having 0–255 levels by an A/D converter.

The two image signal output devices are connected to an interface 22 in an image forming apparatus. The interface 22 selects one of the devices from the reader 20 and the computer 21 through a CPU 24 in response to manipulation of an operator or, one of the reader 20 and the computer 21 automatically selects depending on the image signals to the image forming apparatus, and the image signal from the selected device is transmitted to the printer 23. When the input signal is in the form of a multi-level signal (0–255), the interface 22 does not impart any conversion to the signal level, but if the image signal is bi-level signal from the computer 21, the signal 0 remains 0, and signal 1 is converted to signal 255.

Figure 5:
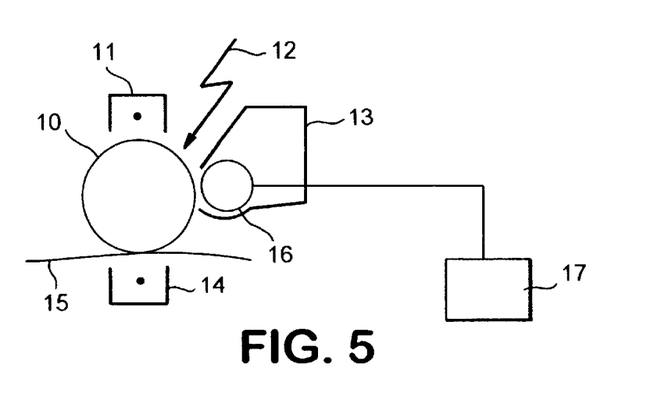
FIG. 5 is a schematic sectional view of a printer according to an embodiment of the present invention.

Referring to FIG. 5, there is shown a sectional view of a major part of a printer in an image forming apparatus of this embodiment. A surface of the image bearing member 10 of OPC photosensitive material or the like is uniformly charged by charging means 11 and is exposed to a scanning laser beam 12 which is emitted in accordance with a signal which is an inputted multi-level image signal (0–255) and which has been subjected to the γ-conversion process. By doing so, an electrostatic latent image is formed on the image bearing member. The electrostatic latent image is developed into a toner image by developing means 13. The toner image is transferred onto a transfer material 15 in the form of a sheet by transfer means 14 in the form of a corona discharger or roller electrode or the like. Thereafter, the toner image is transferred on the transfer material by heat fixing means, and the transfer material is outputted. In this embodiment, the uniformly charged potential of the surface of the image bearing member 10 is –700 V, and the potential of the latent image corresponding to image signal=0 is –700 V, and the latent image potential corresponding to the image signal= 255 is –250 V. The developing means 13 comprises a developer carrying member 16 in the form of a sleeve or the like supplied with a bias voltage containing a DC component. It is faced to the image hearing member 10, so that the electrostatic latent image is developed on the surface of the image bearing member. The developing system of the developing means 13 is a reverse-development system using a toner charged to the negative polarity. The supply of the bias voltage to the developer carrying member 16 is effected by a bias voltage source 17. The bias voltage source 17 changes the DC component of the bias voltage supplied to the developer carrying member 16 in accordance with the control signal coming from the CPU 24.

Figure 1:
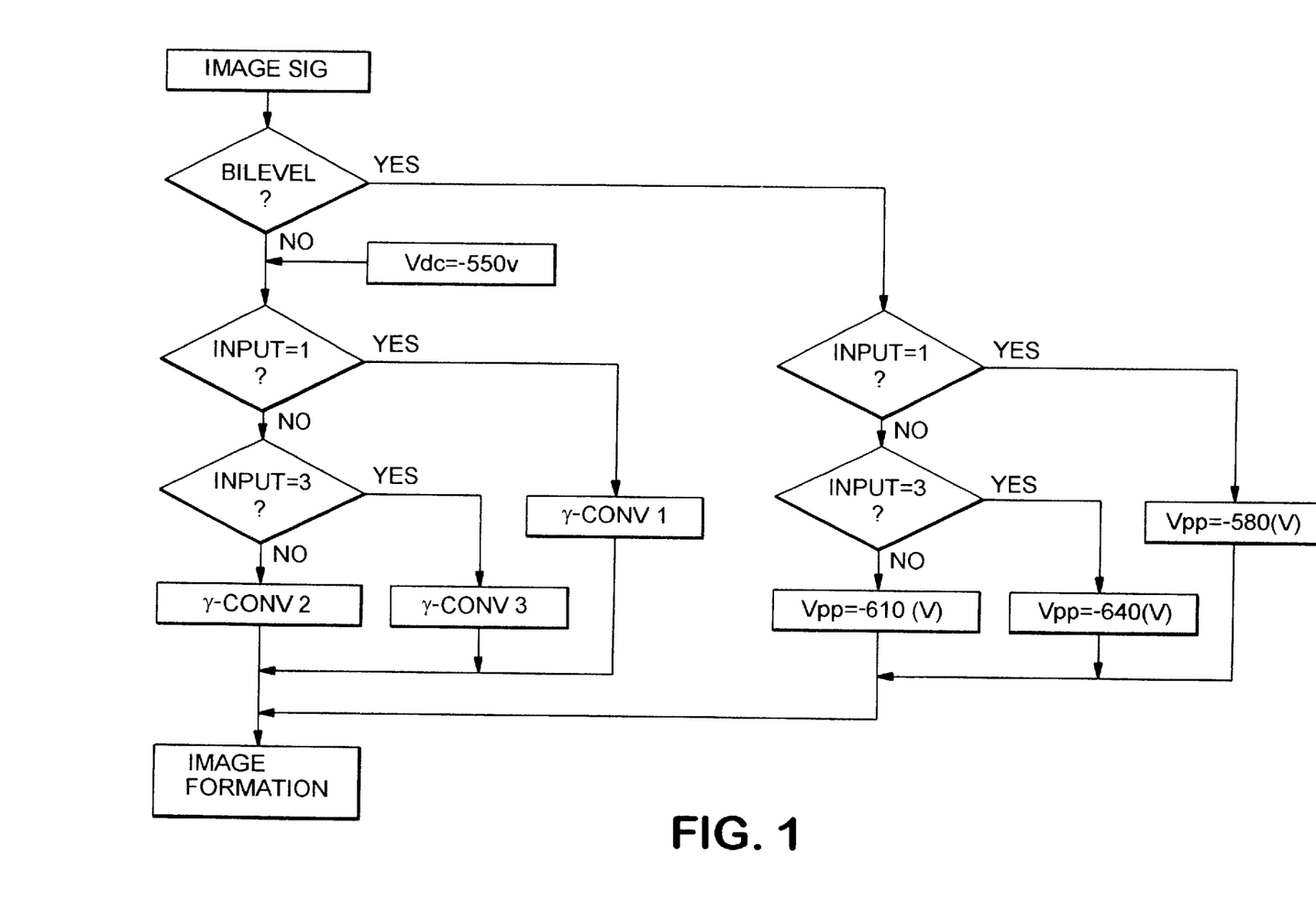
FIG. 1 is a flow chart of sequential operations in a first embodiment of the present invention.
Figure 3:
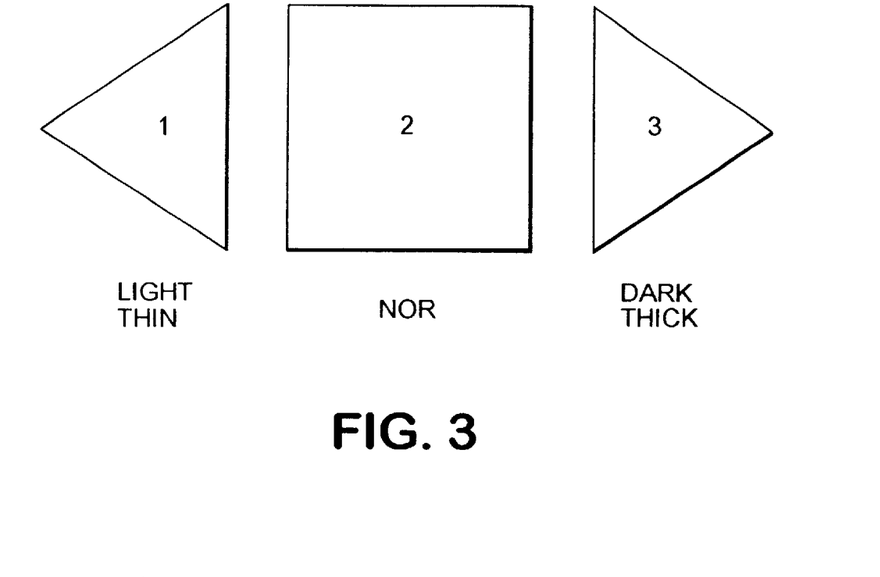
FIG. 3 shows an operating portion for changing output property in an image forming apparatus according to an embodiment of the present invention.

FIG. 1 is a flow chart illustrating an operation of the apparatus. FIG. 3 shows a structure of an actuator 26 for selecting an output property in this embodiment. The signal supplied to the printer 23 from the interface 22 is discriminated by the CPU 24 as to whether or not it is a bi-level signal or a multi-level signal, at the first stage.

When the image signal supplied to the printer 23 is a multi-level signal, the CPU 24 effects the γ-conversion in accordance with the density level set in the operating portion 26 shown in FIG. 3. The developing bias voltage is fixed to −550 V. These are effected by transmitting control signals to the γ-conversion apparatus 25 and the bias voltage source 17. The γ-conversion at this time is carried out such that when the input is 3, that is, the output density is selected to be high, the output-density property is as indicated by a line 3 in FIG. 7, that when the input is 1, that is, a thin image is selected, the output-density property is as indicated by a line 1 in FIG. 7, and that when the input is 2, that is, the standard density is selected, the output-density property is as indicated by a line 2 in FIG. 7. The printer 23 carries out image formation corresponding to the image signals after the γ-conversion in accordance with the selected output property.

When the input image signal is a bi-level signal, the γ-conversion is not carried out, and the DC component of the bias voltage supplied to the developer carrying member 16 is changed in accordance with the signal for a line width adjustment selected by the same actuator portion 26. The developing bias voltage at this time is selected such that when the actuator input is 1, that is, when the line width is thin, −580 V (development contrast=330 V (Vdc), that is, a potential difference between a light portion potential VL and a bias voltage applied to the developer carrying member in this embodiment using the reverse development) is selected, that when the actuator input 3 is selected, that is, when a thick line width is desired, −640 V (development contrast= 390 V) is selected, and that when the actuator input is 2, −610 V (development contrast=360 V) is selected. The printer 23 effects the developing operation with the toner supplied to the developer carrying member 16 to which the bias voltage in accordance with the line width signal is applied.

Embodiment 2

A block diagram for the input path and for the image processing for the image signal, of this embodiment, is the same as in Embodiment 1. The structures and operations of a reader 20, a computer 21, an interface 22 and a printer 23, are the same as with Embodiment 1.

In Embodiment 1, the bi-level input image signals 0 and 1, are converted to bi-level output signals 0 and 255, and are directly supplied to the printer. In this embodiment, in order to enlarge the image signal, there is provided an image signal enlarging means for interpolating the signal level by converting the bi-level image signal to a multi-level image signal, between the interface and the γ-conversion device.

Figure 9:
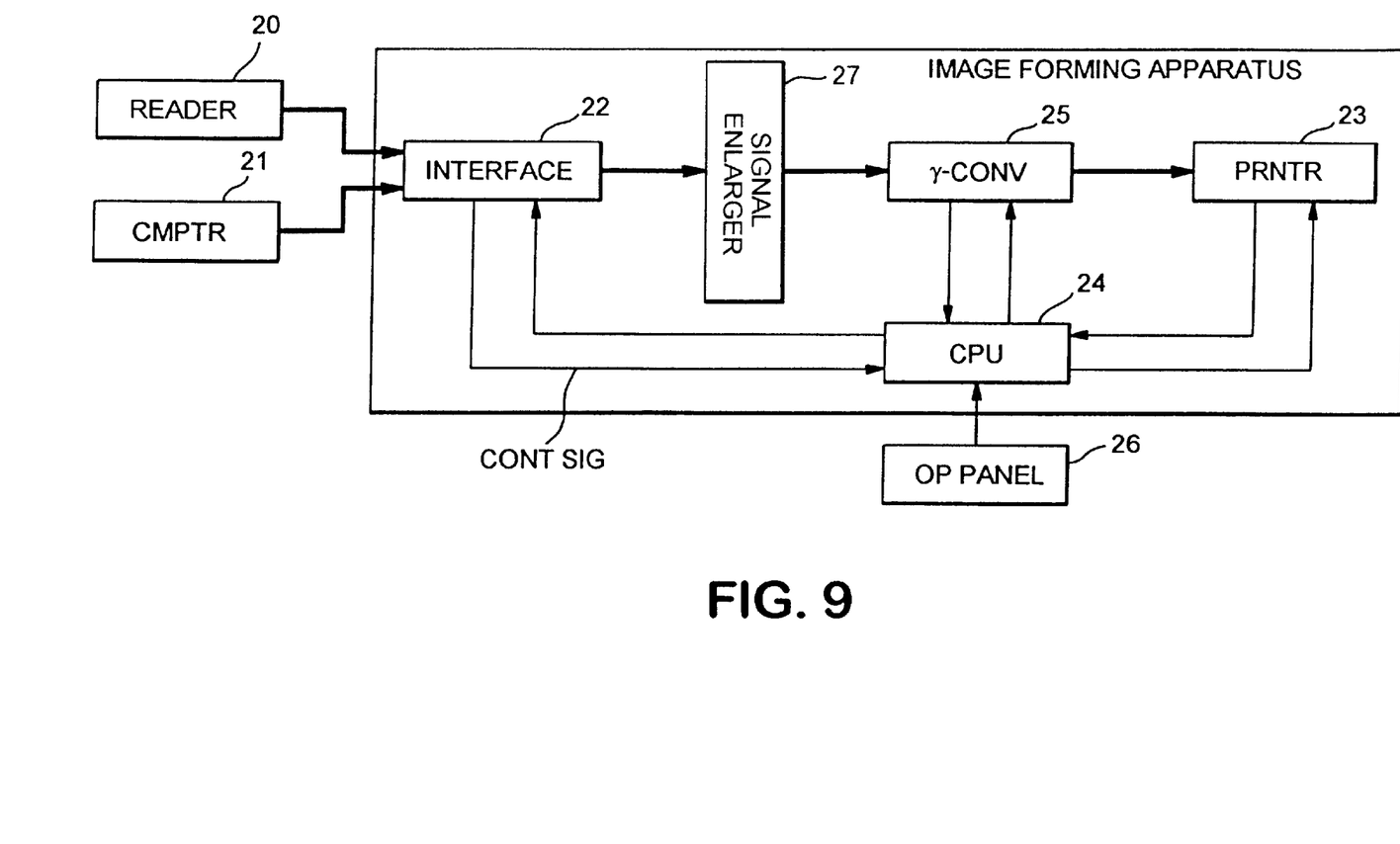
FIG. 9 is a block diagram showing flow of a control signal and an image signal in the second embodiment.

FIG. 9 is a block diagram showing the flow of the control signal and the image signal in this embodiment. When a bi-level signal is supplied to an interface 22 in the image forming apparatus from the computer 21, the interface 22 effects the conversion from 0 to 0 and from 1 to 255, and the resultant image signal is transmitted to a signal enlarging device 27. The enlargement (magnification change) on the signal will be described. When the input image signal has two levels indicating a resolution which is different from the resolution of the printer in the apparatus, the resolution is converted by the image signal enlarging (magnification change) means in the apparatus. For example, when the input image signal has a resolution of 300 dpi (bi-level image signal), and the resolution of the printer in the apparatus is 400 dpi, then the bi-level input image signal is converted to the multi-level image signal (0 to 0, and 1 to 255), and the size of the image signal is enlarged to 1.33 times thereof through linear interpolation. This is effected to prevent the reduction of the size of the output image.

Figure 10:
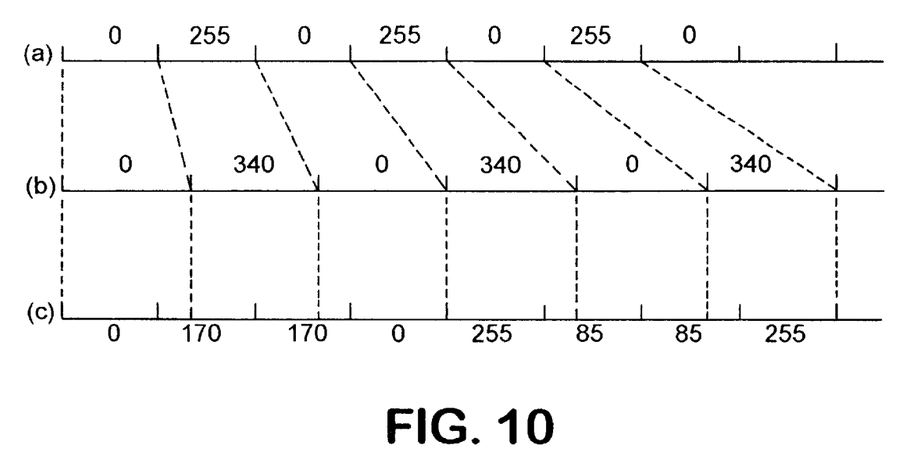
FIG. 10 shows an example of a model of interpolation in an image signal enlarging process.

FIG. 10 shows an example of an interpolation model of the image signal carried out by the image signal magnification change device 27. The magnification is 1.333. FIG. 10(a) shows an image signal transmitted to the image signal enlarging device 26. FIG. 10(b) shows an image signal enlarged to 1.333 time the size of the pixel of the image and the signal level. FIG. 10(c) is an image signal after the linear interpolation so as to provide an original size of the pixel. With this processing, the bi-level image signal is converted to a multi-level image signal.

As will be understood, even the image signal converted to the multi-level image signal by the image signal enlarging device, is required to be converted in the output property changing the line width, when the signal supplied to the image forming apparatus is a bi-level signal. However, even if the γ-conversion process is effected to the image signal converted to the multi-level image signal by the image signal enlarging device, the line width of the output image does not change.

In this embodiment, with respect to the image signal which has been supplied from the computer 21 and which has been enlarged to the bi-level image signal, the image forming operation is carried out with the output property which is the same as for the bi-level image signal which has not been enlarged. By doing so, the line width can be reproduced with the level corresponding to the set in the actuator 26, even for the image signal having been enlarged.

Embodiment 3

In this embodiment, the same advantageous effects can be provided by changing the AC component of the bias voltage applied to the image bearing member 16 in accordance with the nature of the selected image signal. The block diagram of the image forming apparatus and the input path for the image signal in the image forming apparatus, is the same as in Embodiment 1. The structures and operations of the reader 20, the computer 21 and the interface 22, are the same as with Embodiment 1. The printer 23 has the following structure The uniformly charged potential of the surface of the image bearing member 10 is −700 V. The image signal level 0 corresponds to a latent image potential of −700 V, and an image signal level 255 corresponds to −250 V of the latent image potential. The developing means 18 has a developer carrying member 16 supplied with a bias voltage containing an AC component and opposed to the image bearing member 10. It is effective to develop into a toner image the electrostatic latent image on the surface of the image bearing member. The developing system of the developing means 13 is a reverse development system using the toner of the negative polarity. The supply of the bias voltage to the developer carrying member 16 is effected by a bias voltage source 17. In the bias voltage source 17, in accordance with the control signal supplied from the CPU 24, the peak-to-peak voltage of the AC component of the bias voltage supplied to the developer carrying member 16 is changed. The DC component of the bias voltage is always −550 V.

Figure 8:
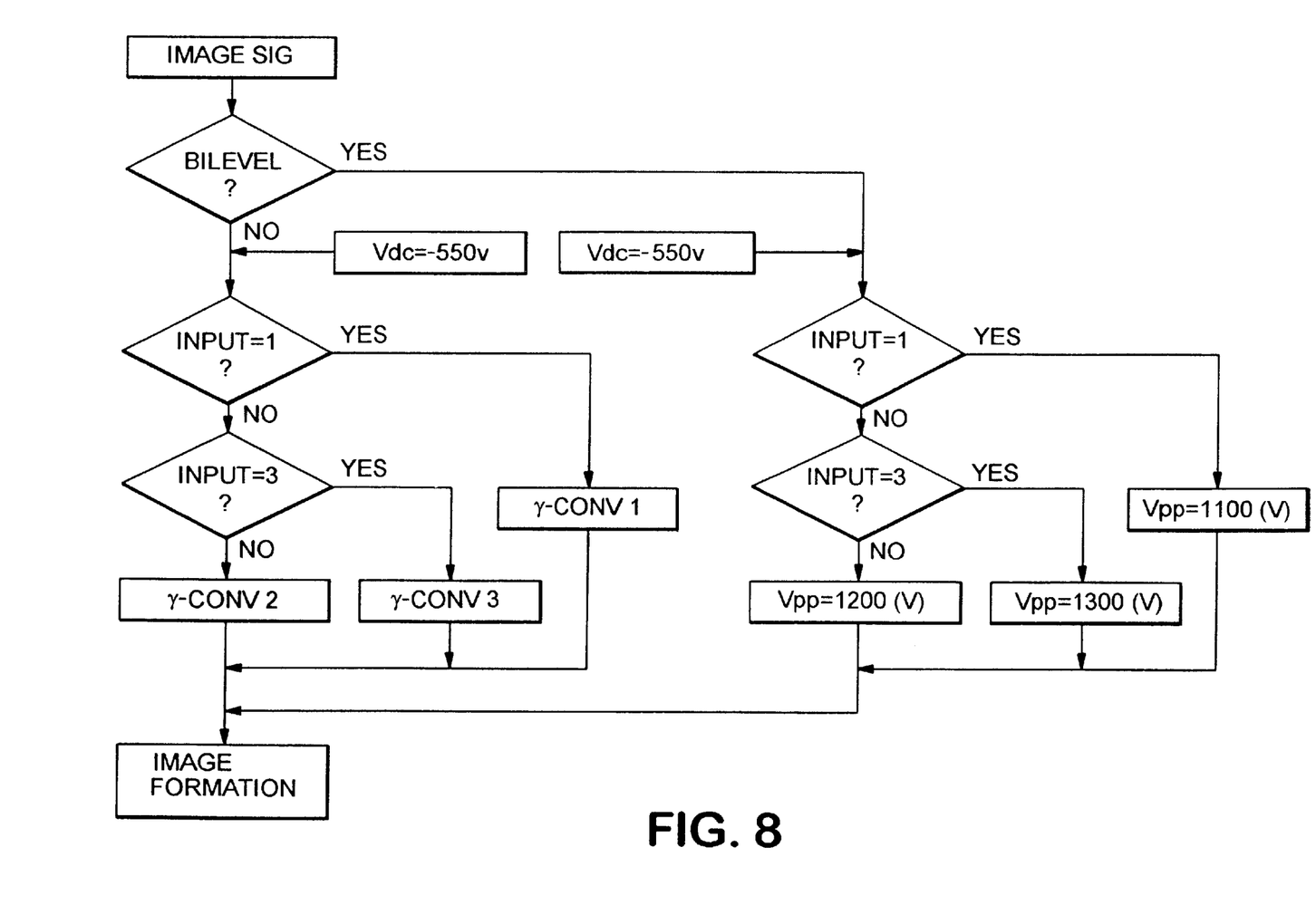
FIG. 8 is a flow chart of an operation in a third embodiment of the present invention.

FIG. 8 is a flow chart illustrating the operation of the apparatus of this embodiment. When the image signal supplied to the γ-conversion device 25 is a multi-level signal from the reader 20, the CPU 24 effects the same operation as in Embodiment 1 to the signal relating to the density from the operation panel 26. At this time, the setting is such that the peak-to-peak voltage of the AC component of the bias voltage supplied to the developer carrying member 16 is 1000 V. The γ-conversion in this case effects a γ-conversion process corresponding to the property without the γ-conversion when the peak-to-peak voltage of the AC component of the bias voltage supplied to the developer carrying member 16 is 1000 V. The γ-conversion at this time is such that when the operation panel (actuator) input is 3, that is, high output density is desired, the output-density property is as indicated by a line 3 in FIG. 7, that when the actuator input is 1, that is, a thin density is desired, the output-density property is as indicated by a line 1 in FIG. 7, and that when the actuator input is 2, that is, when the standard density is desired, the output-density property is as indicated by a line 2 in FIG. 7.

Figure 11:
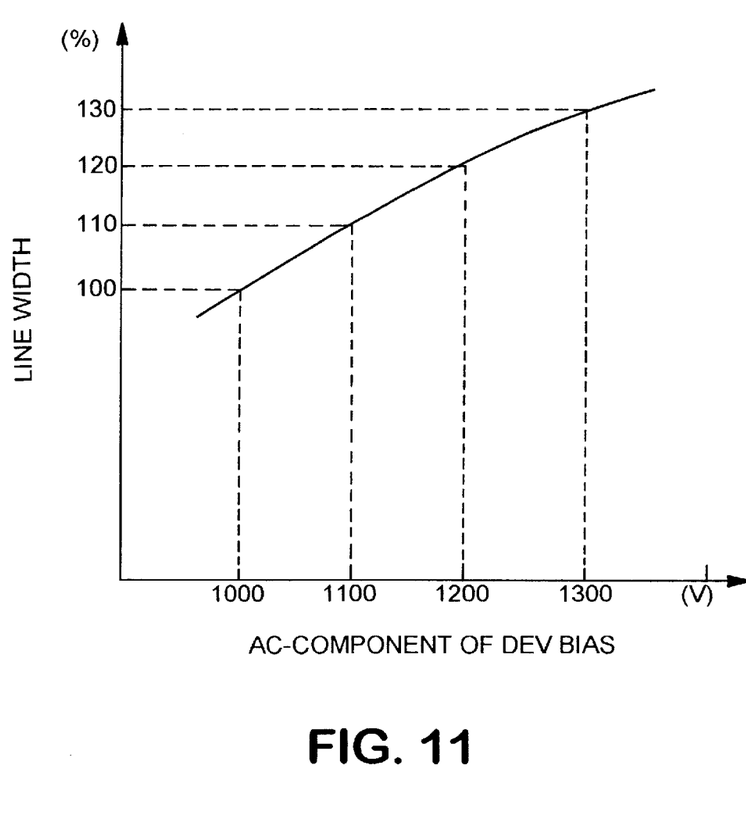
FIG. 11 shows a relationship between a size of an AC component of the developing bias and a reproduction property of the line width.

When the input image signal is a bi-level signal, the peak-to-peak voltage of the AC component of the bias voltage supplied to the image bearing member 16 is changed in accordance with a line width signal set in the operating portion 26. More particularly, when the actuator input is 1, that is, when a thin line width is desired, 1100 V is selected; when the actuator input is 3, that is, a thick line width is desired, 1300 V is selected; and when the actuator input is 2, 1200 V is selected. The printer 23 performs the image forming operation with the developer carrying member 16 supplied with a bias voltage in accordance with a line width adjusting signal set in the operation panel. FIG. 11 shows a relationship between the magnitude of the AC component in the developing bias voltage and a line width.

In the foregoing embodiments, the digital image signal to be supplied to the main apparatus containing the printer, are in the form of either bi-level or multi-level. In addition to this, a bi-level image signal may be converted to a multi-level image signal by a linear interpolation process, as in Embodiment 2. In this case, a separate multi-level image signal input terminal for the linear interpolation process may be provided.

The main apparatus containing the printer may be a digital copying machine containing as a unit also an image reader for reading the original image, a digital facsimile machine, or a compound apparatus having these functions.

As for the γ-conversion method for a multi-level digital image signal, a method of changing light quantity of the light information by operating a lever, the charging amount may be changed, in addition to the use of the table conversion. They may be combined. By using the same operating portion (actuator portion) as in Embodiment 1 in the image formation from bi-level and multi-level signals, the operativity is improved.

As described in the foregoing, according to the present invention, there are provided input paths for a plurality of kinds of digital image signals, and one path is selected therefrom. The light information from a digital optical system such as a laser beam or the like emitted in accordance with the digital image signal supplied through the selected input path, is projected on the surface of the image bearing member, and the resultant image is developed into a toner image by developing means. The output property is changed by different means depending on the kinds of the input signal. By doing so, the proper image forming operation is accomplished irrespective of the kinds of the input signal. By doing so, the high operativity output property changing device can be accomplished.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

a photosensitive member;

a light source for emitting onto said photosensitive member a light beam modulated in accordance with a digital image signal, the digital image signal representing a selectable one of bi-level and multi-level image data;

developing means for developing an electrostatic image formed on said photosensitive member by exposure of said photosensitive member to the modulated light beam;

multi-level image adjusting means for adjusting the image by changing a γ conversion characteristic when the digital image signal represents multi-level image data; and bi-level image adjusting means for adjusting the image by changing a development condition when the digital image signal represents bi-level image data, wherein, when the digital image signal represents multi-level image data, the γ conversion characteristic is changed and the development condition is unchanged when forming the image; and wherein, when the digital image signal represents bi-level image data, the development condition is changed and the γ conversion characteristic is unchanged when forming the image.

2. An apparatus according to claim 1, wherein said developing means includes a developer carrying member for carrying a developer to a developing position, wherein a developing bias voltage is applied to said developer carrying member, and wherein the development condition is the developing bias voltage.

3. An apparatus according to claim 2, wherein when the development condition is changed, a development contrast potential is changed, and when the development condition is not changed, the development contrast potential is not changed.

4. An apparatus according to claim 2, wherein the developing bias voltage contains an AC component, and the development condition is the AC component.

5. An apparatus according to claim 1, further comprising converting means for converting a digital image signal representing bi-level image data into a digital image signal representing multi-level image data, wherein said light source modulates the light beam in accordance with the converted digital image signal representing multi-level image data.

6. An apparatus according to claim 1, further comprising a first input port for receiving a digital image signal representing bi-level image data and a second input port for receiving a digital image signal representing multi-level image data.

7. An apparatus according to claim 6, further comprising at least one of a computer connected to said first input port, and an image reader connected to said second input port.

8. An apparatus according to claim 1, wherein said light source comprises a laser.

9. An apparatus according to claim 1, wherein said multi-level image adjusting means adjusts the γ conversion characteristic in accordance with an image density.

10. An apparatus according to claim 1, wherein when the digital image signal represents the bi-level image data, said bi-level image adjusting means adjusts the developing condition in accordance with a line width.

11. An image forming apparatus, comprising:

a photosensitive member;

a light source for emitting onto said photosensitive member a light beam modulated in accordance with a digital image signal, the digital image signal representing a selectable one of either bi-level or multi-level image data;

developing means for developing an electrostatic image formed on said photosensitive member by exposure of said photosensitive member to the modulated light beam;

density setting means for variably setting a density of the image developed on said photosensitive member;

first changing means for changing a γ conversion characteristic in accordance with the density set by said density setting means when the digital image signal represents multi-level image data; and second changing means for changing a development condition, in accordance with the density set by said density setting means, when the digital image signal represents bi-level image data, wherein, when the digital image signal represents multi-level image data, the γ conversion characteristic is changed and the development condition is unchanged when forming the image; and wherein, when the digital image signal represents bi-level image data, the development condition is changed and the γ conversion characteristic is unchanged when forming the image.

12. An apparatus according to claim 11, wherein when the digital image signal represents the bi-level image data, a line width of the image changes with the image density.

13. An apparatus according to claim 11, wherein the density setting means is manually operable.

14. An image forming apparatus, comprising:

a photosensitive member;

a light source for emitting onto said photosensitive member a light beam modulated in accordance with a digital image signal;

developing means for developing an electrostatic image formed on said photosensitive member by exposure of said photosensitive member to the modulated light beam;

density setting means for variably setting a density of the image developed on said photosensitive member;

first changing means for changing γ conversion characteristics in accordance with the image density set by said density setting means; and second changing means for changing a development condition in accordance with the image density set by said density setting means, wherein, when the digital image signal represents multi-level image data, the γ conversion characteristic is changed and the development condition is unchanged when forming the image; and wherein, when the digital image signal represents bi-level image data, the development condition is changed and the γ conversion characteristic is unchanged when forming the image.

* * * * *